(12) United States Patent
Hida et al.

(10) Patent No.: US 9,032,235 B2
(45) Date of Patent: May 12, 2015

(54) SEMICONDUCTOR STORAGE DEVICE AND METHOD FOR CONTROLLING THE SEMICONDUCTOR STORAGE DEVICE

(71) Applicants: Toshikatsu Hida, Yokohama (JP); Mitsunori Tadokoro, Fujisawa (JP)

(72) Inventors: Toshikatsu Hida, Yokohama (JP); Mitsunori Tadokoro, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 267 days.

(21) Appl. No.: 13/727,984

(22) Filed: Dec. 27, 2012

(65) Prior Publication Data

US 2014/0040650 A1 Feb. 6, 2014

Related U.S. Application Data

(60) Provisional application No. 61/677,557, filed on Jul. 31, 2012.

(51) Int. Cl.
| | |
|---|---|
| *G06F 1/00* | (2006.01) |
| *G06F 1/32* | (2006.01) |
| *G06F 12/00* | (2006.01) |
| *G06F 11/00* | (2006.01) |

(52) U.S. Cl.
CPC ............ *G06F 1/3275* (2013.01); *G06F 1/3287* (2013.01); *G06F 1/3225* (2013.01)

(58) Field of Classification Search
CPC .............................. G06F 1/3275; G06F 1/3287
USPC ................... 713/320, 324; 365/226; 711/100; 714/6.1, 15
See application file for complete search history.

(56) References Cited

U.S. PATENT DOCUMENTS

| | | | | |
|---|---|---|---|---|
| 8,266,371 | B2* | 9/2012 | Toyama | 711/103 |
| 8,819,391 | B1* | 8/2014 | Lock et al. | 711/206 |
| 2006/0010282 | A1* | 1/2006 | Kim | 711/103 |
| 2011/0231687 | A1 | 9/2011 | Takeyama et al. | |

FOREIGN PATENT DOCUMENTS

| | | |
|---|---|---|
| JP | 06-259339 | 9/1994 |
| JP | 07-146820 | 6/1995 |
| JP | 2011-192212 | 9/2011 |

OTHER PUBLICATIONS

U.S. Appl. No. 14/302,835, filed Jun. 12, 2014, Asami, et al.

* cited by examiner

*Primary Examiner* — Stefan Stoynov
(74) *Attorney, Agent, or Firm* — Oblon, McClelland, Maier & Neustadt, L.L.P.

(57) ABSTRACT

According to one embodiment, a semiconductor storage device includes a nonvolatile memory, memory controller storing control information, a switch between the nonvolatile memory/memory controller and a power supply terminal, a second memory, an interpreter interprets a command, a switch controller, and a third memory stores an address of the control information in the second memory. The memory controller instructs the switch controller to open the switch after writing the control information into the second memory and reads the control information from the second memory based on the address stored in the third memory when the memory controller is electrically connected to the first power supply terminal.

19 Claims, 9 Drawing Sheets

SEMICONDUCTOR STORAGE DEVICE AND METHOD FOR CONTROLLING THE SEMICONDUCTOR STORAGE DEVICE

CROSS-REFERENCE TO RELATED APPLICATIONS

This application claims the benefit of U.S. Provisional Application No. 61/677,557, filed Jul. 31, 2012, the entire contents of which are incorporated herein by reference.

FIELD

Embodiments described herein relate generally to a semiconductor storage device and a method for controlling the semiconductor storage device.

BACKGROUND

Low power consumption is required of a semiconductor storage device including a nonvolatile memory. In particular, in a semiconductor storage device to be introduced into a battery-operated mobile device such as a portable device or the like, the requirement is high, and various power consumption reduction schemes are now being examined. As an example, in a semiconductor storage device, it is known that the influence on a battery of the degree of power consumption during an idle period when there is no host access is great, and low power consumption during an idle period is therefore now being examined.

On the other hand, the performance of the semiconductor storage device is high, an ASIC (Application Specific Integrated Circuit) forming the semiconductor storage device is large in the present circumstances, and battery consumption due to leakage current is unignorable even in a non-operating state.

In order to realize low power consumption, although power-off of the semiconductor storage device during an idle period is conceivable, in this case, the time necessary for a host to obtain the access-enabled state becomes longer when the host is to carry out access. Furthermore, the power of the memory in which management data is stored is also turned off, and hence it is necessary to write the management data stored in the memory to a backup nonvolatile memory. Under such circumstances that the power is frequently turned off, the rewriting amount of the nonvolatile memory is increased by the backup processing, and the reliability of the nonvolatile memory is lowered.

DETAILED DESCRIPTION

In general, according to one embodiment, a semiconductor storage device includes a nonvolatile first memory, memory controller, switch provided between the first memory or the memory controller, and a power supply terminal, second memory, interpreter configured to interpret an instruction from a host system, switch controller, and third memory. The memory controller is electrically connected to the first memory, and includes management data on the first memory. The second memory stores therein the management data read from the memory controller. The switch controller turns off the switch on the basis of an instruction from the memory controller, and turns on the switch on the basis of an interpretation result of the interpreter. The third memory stores therein an address of the management data in the second memory. After writing the management data to the second memory, the memory controller instructs the switch controller to turn off the switch and, when electrically connected to the power supply terminal, reads the management data from the second memory on the basis of the address stored in the third memory.

Figure 1:
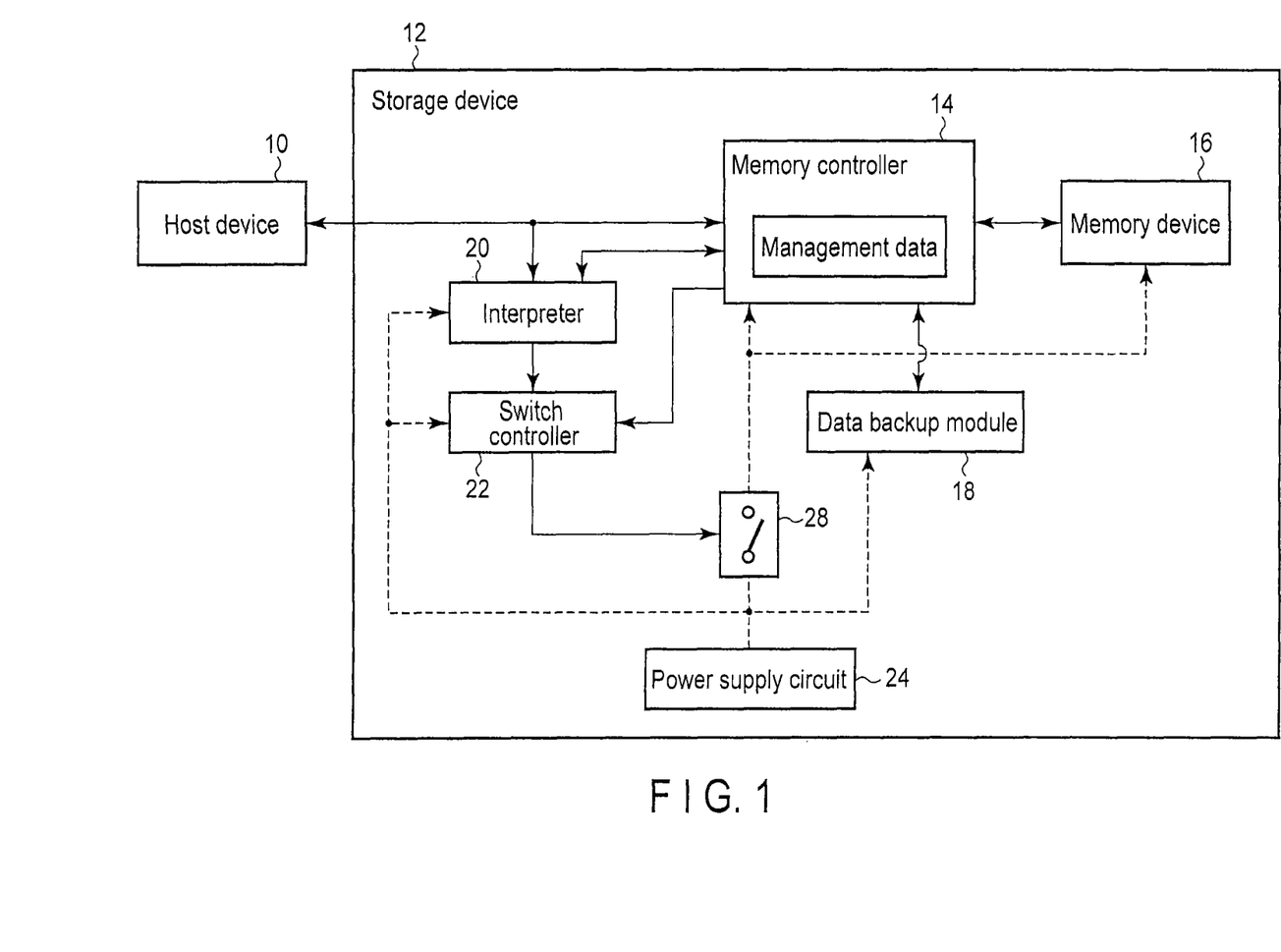
FIG. 1 is an exemplary view showing a semiconductor storage device according to an embodiment.

FIG. 1 is a block diagram of a semiconductor storage device of a first embodiment. In the first embodiment, a supply of power to part of the semiconductor storage device is turned off during an idle period, whereby power consumption during the idle period is reduced. In order to prevent the management data in the memory from being lost by turning off the power supply, the management data is temporarily moved to a backup memory. The backup memory is not limited to a nonvolatile memory, and may be a volatile memory with power-backup. The latter will be described in a second embodiment.

A semiconductor storage device 12 (hereinafter simply may be referred to as a storage device) is a device known also as a solid-state drive (SSD) to be used in place of a hard disk drive, and is electrically connected to a host device 10 such as a personal computer or the like.

The semiconductor storage device 12 includes a memory controller 14 configured to communicate with the host device 10, and execute data transfer, a memory device 16 electrically connected to the memory controller 14, and including a nonvolatile memory, a data backup module 18 electrically connected to the memory controller 14, an interpreter 20 electrically connected between the host device 10 and memory controller 14, and configured to interpret an instruction exchanged between the host device 10 and memory controller 14 to transmit an interpretation result to the memory controller 14, a switch controller 22, a power supply circuit 24, and a switch 28 inserted in a power supply line between the power supply circuit 24 and memory controller 14 or the memory device 16. The data backup module 18 stores therein data for backup processing of writing management data on the memory stored in the memory controller 14 to a backup memory when the power supply of the memory controller 14 is turned off/restore processing of reading the management data from the backup memory, and writing the read management data to the memory controller 14 to restore the management data to the memory controller 14. The switch controller 22 controls the switch 28 and, if necessary, turns off the switch 28. Thereby, power supply from the power supply circuit 24 to the memory device 16 is stopped, and low power consumption is realized. Power is supplied at all times to the interpreter 20, switch controller 22, and data backup module 18 from the power supply circuit 24.

The constituent elements of the semiconductor storage device 12 are divided into two power supply domains. Dotted lines in FIG. 1 show supply of power.

It should be noted that the specific configuration in the semiconductor storage device 12 is not limited to the embodiment of FIG. 1 and, for example, the data backup module 18, interpreter 20, and switch controller 22 may be arranged in the memory controller 14, and the switch 28 may be arranged in the power supply circuit 24. In this case, a power supply circuit for the memory controller 14 and the memory device 16, and a power supply circuit for the interpreter 20, the switch controller 22, and the data backup module 18 are separately provided, and a switch function is imparted to the power supply circuit for the memory controller 14 and the memory device 16. Further, a power supply circuit may be externally provided, and only the power supply terminal connected to the power supply circuit may be included in the semiconductor storage device.

Figure 2:
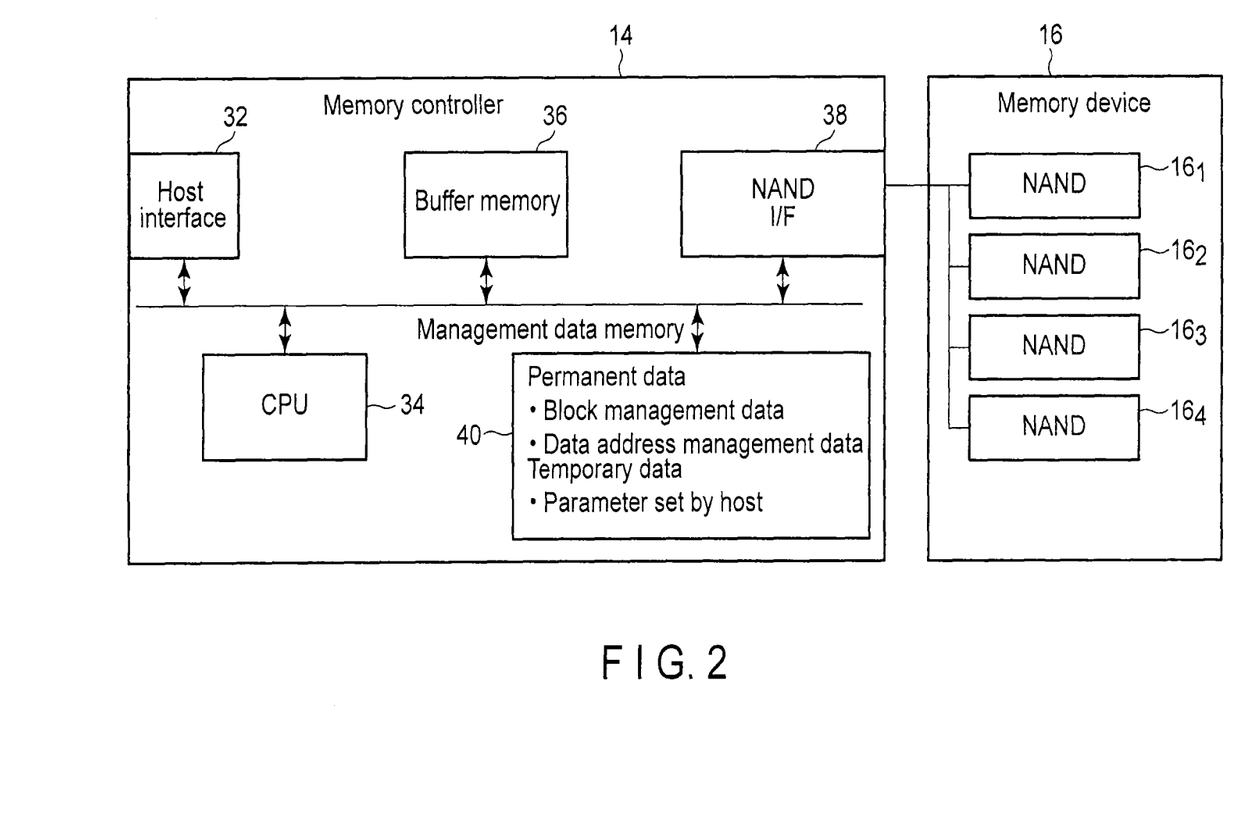
FIG. 2 is an exemplary view showing a memory controller in the semiconductor storage device.

Hereinafter, details of the constituent elements of the storage device 12 will be given. The internal configurations of the memory controller 14, and memory device 16 are shown in FIG. 2.

The memory device 16 includes NAND flash memories $16_1$, $16_2$, $16_3$, and $16_4$ which are a plurality of, for example, four channels of nonvolatile memories configured to actually store data.

The memory controller 14 includes a NAND interface 38 configured to control the memory device 16, a host interface 32 configured to communicate with the host device 10, a CPU 34 for control, and various memories including volatile RAMs. The various memories include a buffer memory 36, and a management data memory 40. The memory controller 14 carries out data transfer between itself and the host device 10 in accordance with an instruction from the host device 10. That is, the memory controller 14 writes data transferred thereto from the host device 10 to the memory device 16 in response to an instruction from the host device 10, and transfers data read from the memory device 16 to the host device 10.

The management data stored in the management data memory 40 is data used by the CPU 34 to manage the state of NAND flash memories $16_1$, $16_2$, $16_3$, and $16_4$. The management data includes permanent management data configured to manage the memory device 16, and manage correspondence relationships between data items, and temporary management data to be set during the operation. The permanent data includes block management data, data address management data, and the like. The temporary data includes a parameter, and the like set by the host device 10.

The permanent data includes a logical address/physical address conversion table necessary for determining addresses of data items stored in the NAND flash memories $16_1$, $16_2$, $16_3$, and $16_4$. The NAND flash memories $16_1$, $16_2$, $16_3$, and $16_4$ each have characteristics of requiring data copying processing between blocks at the time of rewriting, and hence logical block addresses managed by the host device 10 side, and actual physical block addresses on the NAND flash memories $16_1$, $16_2$, $16_3$, and $16_4$ side do not coincide with each other. Accordingly, after converting a logical block address into a physical block address by using the logical address/physical address conversion table, a block to be actually accessed is specified on the basis of the physical block address. The block management data includes a table configured to manage data indicating the state of a block, for example, whether the block is in an erased state or the block is unusable.

The NAND interface 38, host interface 32, CPU 34, buffer memory 36, and management data memory 40 are electrically connected to a bus line.

Figure 3:
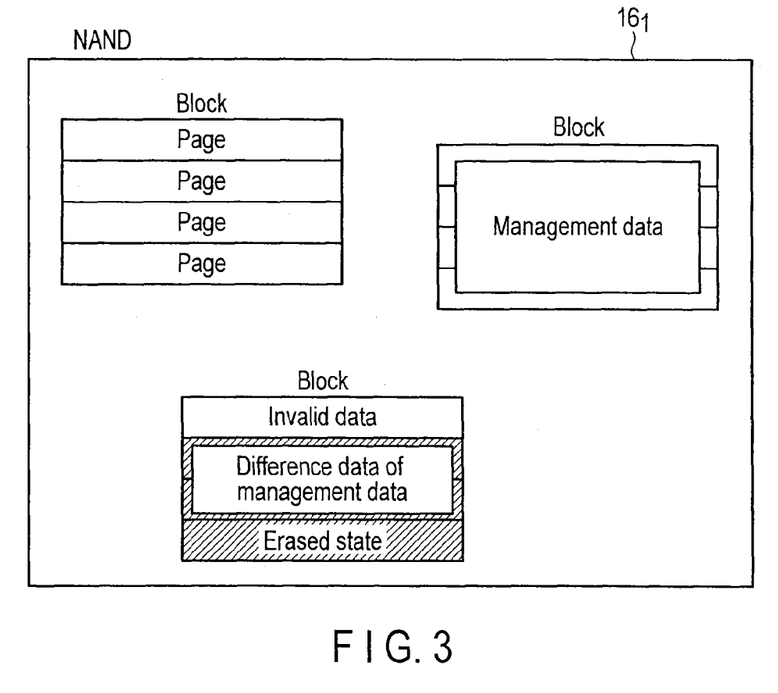
FIG. 3 is an exemplary view showing a NAND flash memory in the semiconductor storage device.

FIG. 3 shows NAND flash memory $16_1$ included in the memory device 16. The other memories $16_2$, $16_3$, and $16_4$ also each have the same structure. In the following description, when only NAND flash memory $16_1$ is shown for convenience of description, the same description can also be applied to the other memories $16_2$, $16_3$, and $16_4$. NAND flash memory $16_1$ includes a plurality of blocks which are an erase unit, and each of the blocks includes a plurality of pages which are a write/read unit. Dump data of the entire management data read from the management data memory 40 of the memory controller 14 is stored in a certain block. Difference data which is only a changed part of the management data, and invalid data are stored in the other block. As described above, the dump data of the entire management data, and difference data of the management data are separately stored in different blocks. It should be noted that it is not necessary for the management data to be written to all NAND flash memories $16_1$, $16_2$, $16_3$, and $16_4$, and the management data may be written to only the flash memory $16_1$.

Figure 4:
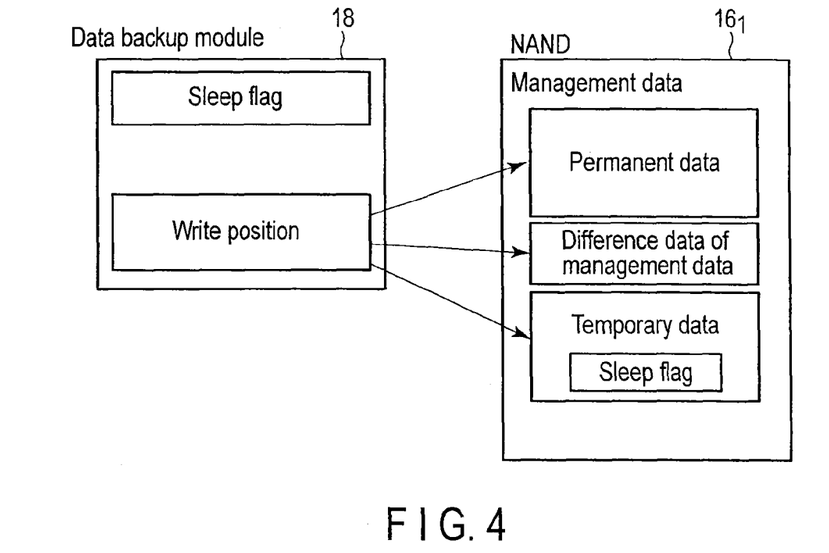
FIG. 4 is an exemplary view showing an information backup module and the NAND flash memory in the semiconductor storage device.

FIG. 4 shows the internal configurations of the data backup module 18, and NAND flash memory $16_1$. The data backup module 18 stores therein a sleep flag indicating whether or not the semiconductor storage device 12 is partly in the power-off state in order to reduce the power consumption, that is, whether or not the switch 28 has been turned off, and write position data which is pointer data indicating a write position (write address) of the management data stored in NAND flash memory $16_1$. As shown in FIG. 3, although the dump data of the entire management data, and the difference data are stored at different write positions, in FIG. 4, regarding the entire dump data of the management data, the permanent data, and temporary data are stored at different write positions. A copy of the sleep flag in the data backup module 18 is also included in the temporary data. Accordingly, the write position includes write addresses of three areas including the permanent management data, temporary management data, and difference data of the management data.

Figure 5:
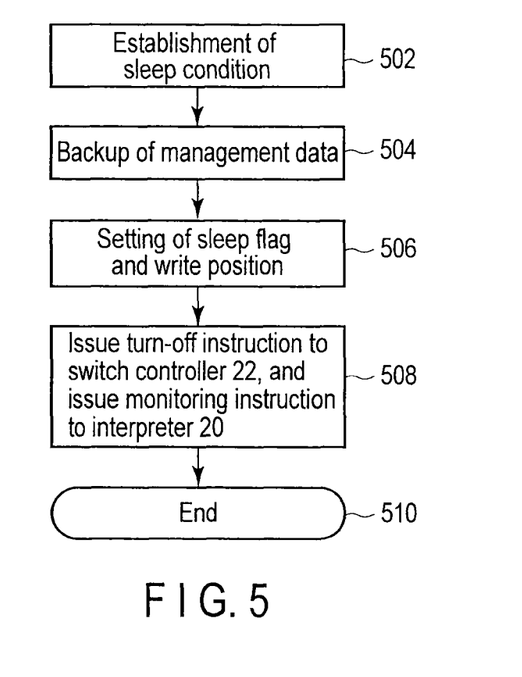
FIG. 5 is an exemplary view showing a power-off processing of the data controller.

FIG. 5 is a flowchart of power-off processing of the memory controller 14. When there is no access from the host device 10, the memory controller 14 turns off the switch 28 to turn off the power of almost all the part of the semiconductor storage device 12, thereby reducing the power consumption during the idle period. In order to determine whether or not the switch 28 is to be turned off, it is determined whether or not a predetermined sleep condition can be established. The sleep conditions include a condition that a standby instruction be transmitted from the host device 10, condition that access from the host device 10 be not made for a certain period of time or more, condition that being in the idle state be detected internally, and the like. Furthermore, a case where the interpreter 20 detects assertion of a signal line provided for the host device 10 to bring the semiconductor storage device 12 into a sleep state is also one of the predetermined sleep conditions.

Having confirmed in step 502 that a sleep condition is established, the memory controller 14 executes in step 504 backup processing of the management data. When the switch 28 is turned off, data of the management data memory 40 of the memory controller 14 including a RAM to which power has been supplied from the power supply circuit 24 is lost. Accordingly, in order for the management data not to be lost, the management data is written to the backup memory in which data can be stored even when the power supply from the power supply circuit 24 is stopped. In the first embodiment, as the backup memory, the NAND flash memory $16_1$ which is a nonvolatile semiconductor memory is used. In step 504, as shown in FIG. 4, the memory controller 14 writes the management data (permanent data, and temporary data) in the management data memory 40 to the NAND flash memory $16_1$ (details of this operation are given in FIG. 10).

In step 506, the sleep flag in the data backup module 18 is made on, and the write address of the management data stored in the NAND flash memory $16_1$ is set at the write position in the data backup module 18. The set sleep flag is stored in the NAND flash memory $16_1$ as part of the temporary data.

In step 508, the memory controller 14 issues a turn-off instruction to the switch controller 22, and issues a monitoring instruction to the interpreter 20. Thereby, part (memory controller 14, and memory device 16) of the semiconductor storage device 12 is powered off, and the semiconductor storage device 12 is brought into the sleep state. However, the interpreter 20 continuously receives power supply from the power supply circuit 24, and hence operates in the sleep state to monitor an instruction from the host device 10.

Figure 6:
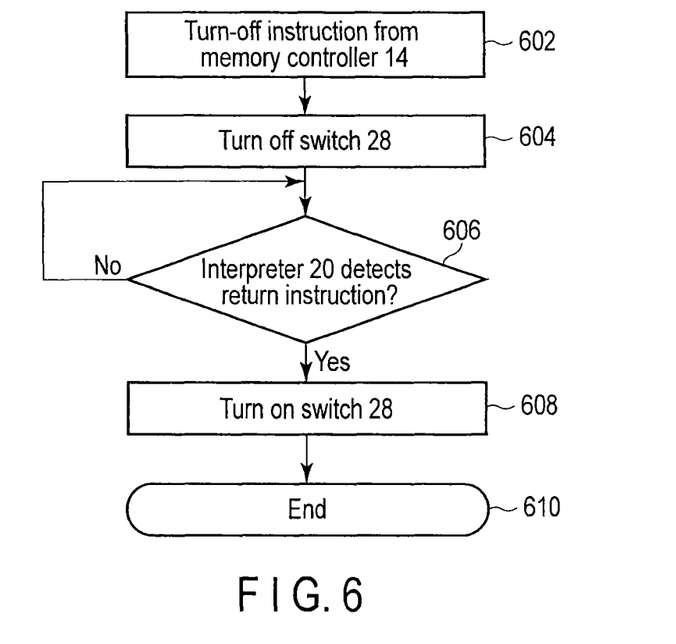
FIG. 6 is an exemplary view showing an operation of a switch controller in the semiconductor storage device.

FIG. 6 is a flowchart of power-off processing to be carried out when the switch controller 22 receives a turn-off instruction from the memory controller 14 (step 508 of FIG. 5). When reception of the turn-off instruction is confirmed in step 602, the switch 28 is turned off in step 604. As a result, the power supply from the power supply circuit 24 to the memory controller 14 and memory device 16 is stopped. The power supply from the power supply circuit 24 to the data backup module 18, switch controller 22, and interpreter 20 is continued. In step 606, it is determined whether or not the interpreter 20 has detected a return instruction. When it is determined that the interpreter 20 has detected no return instruction, step 606 is repetitively executed. When the interpreter 20 has detected the return instruction, the switch 28 is turned on in step 608, and the power supply from the power supply circuit 24 to the memory controller 14 and memory device 16 is resumed. Thereby, the switch controller 22 sets the switch to the off-state for a period from reception of the turn-off instruction from the memory controller 14 to detection of the return instruction by the interpreter 20.

Figure 7:
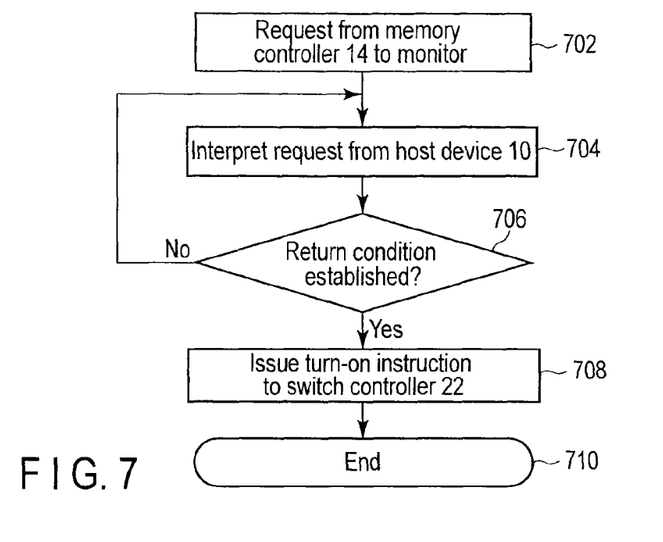
FIG. 7 is an exemplary view showing an operation of an interpreter in the semiconductor storage device.

FIG. 7 is a flowchart showing an operation of the interpreter 20. The interpreter 20 is supplied with power by the power supply circuit 24, and hence operates even during the intermission of the power supply to the memory controller 14 and memory device 16. Having received a monitoring instruction (step 508 of FIG. 5) from the memory controller 14 in step 702, the interpreter 20 monitors an instruction from the host device 10 in step 704, and interprets the instruction. The above operation is carried out in order to wait for an instruction to return the semiconductor storage device 12 in the sleep state to the original active state.

In step 706, it is determined whether or not a return condition of the power supply has been established. As an example of determination of establishment of the return condition, the interpreter 20 monitors assertion/deassertion of the signal line provided for the host device 10 to turn off the power of the semiconductor storage device 12 and, when deassertion is detected, it is determined in some cases that an instruction to recover the power supply has been issued. When the return condition has been established, the interpreter 20 issues a turn-on instruction to the switch controller 22 in step 708. In accordance with the turn-on instruction, the determination result of step 606 of FIG. 6 becomes "Yes", and the switch 28 is turned on in step 608. As a result, the power supply from the power supply circuit 24 to the memory controller 14, and memory device 16 is resumed.

Figure 8:
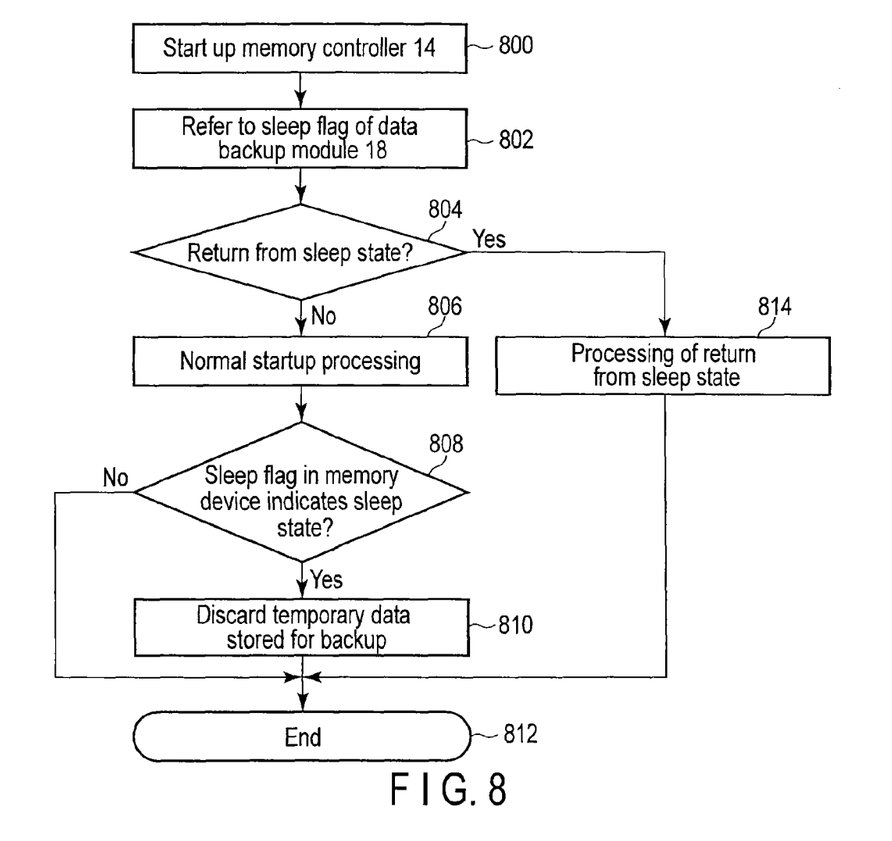
FIG. 8 is an exemplary view showing a power-on processing of the memory controller.

FIG. 8 is a flowchart showing processing to be carried out at the time of power-on of the memory controller 14. When the power supply (power supply circuit 24) is turned on, the memory controller 14 first refers to the sleep flag in the data backup module 18 in step 802. It is determined in step 804 whether a return from the sleep state is to be carried out or normal startup processing is to be carried out. When no sleep flag is set, it is determined that normal startup processing is to be carried out, and normal startup processing is executed in step 806. When the sleep flag is set, processing of a return from the sleep state is executed in step 814. Although details of the processing of a return from the sleep state are given in FIG. 12, the processing is reading the management data from the NAND flash memory $16_1$ on the basis of the write position (pointer data) of the data backup module 18, and writing the management data to the memory controller 14. That is, the processing is restoring the management data lost from the management data memory 40 the power supply of which has been turned off to the management data memory 40 the power supply of which is turned on again. When the processing of a return from the sleep state of step 814 is terminated, the processing of FIG. 8 is terminated. However, when the normal startup processing of step 806 is terminated, the sleep flag included in the temporary data in the NAND flash memory $16_1$ is confirmed in step 808, and it is determined whether or not the power supply has been in the off-state in the sleep state. When the power supply has been in the off-state in the sleep state, temporary data of the management data is stored in the NAND flash memory $16_1$ in some cases, and hence the temporary management data stored in the NAND flash memory $16_1$ is discarded in step 810, thereby completing the startup processing.

Figure 9:
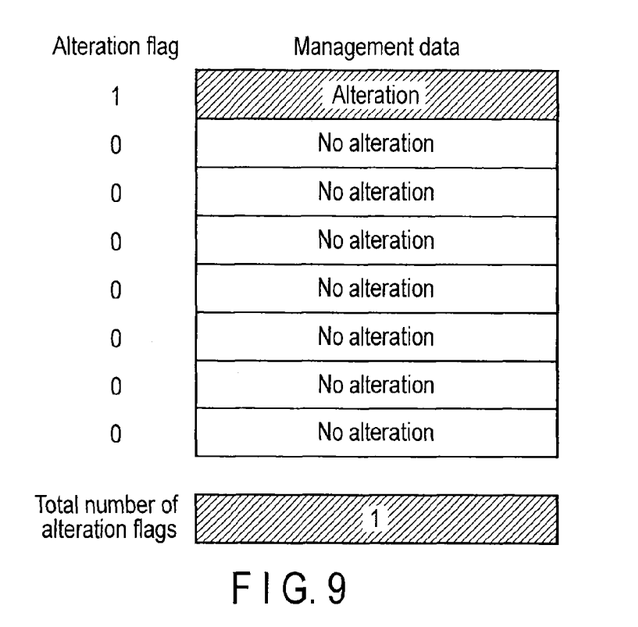
FIG. 9 is an exemplary view showing control information in a control memory in the memory controller.

Next, backup processing (step 504 of FIG. 5) of the management data will be described below. In this embodiment, as shown in FIG. 9, in the management data memory 40, the entire management data is divided into a plurality of small areas according to a certain rule, and an alteration flag is added to each of the divided management areas. The alteration flag means whether or not rewriting has occurred and is set when data of a corresponding area of the memory device has been rewritten. Further, the total number of management data items to which alteration flags are set is additionally stored in the management data memory 40.

Figure 10:
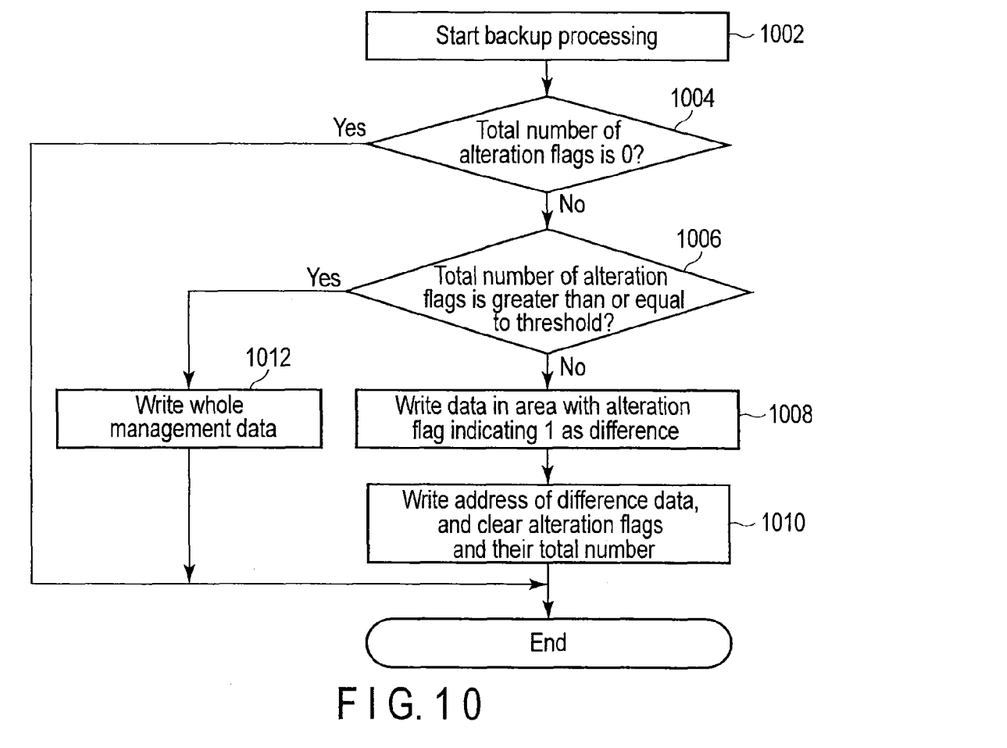
FIG. 10 is an exemplary view showing a backup processing of the control information.

At the time of power-off, as shown in step 1004 of FIG. 10, the memory controller 14 firstly determines whether or not the total number of alteration flags in the management data memory 40 is zero. When the total number of alteration flags is zero, that is, when the management data items are not rewritten at all, the processing is terminated without executing the backup processing of the management data. Thereby, for example, when only a read instruction has arrived, it becomes possible to make the rewriting amount of the nonvolatile memory at the time of transition to the sleep state zero.

When the total number of alteration flags is not zero, it is determined in step 1006 whether or not the total number of alteration flags is greater than or equal to a threshold. When the total number of alteration flags is not greater than or equal to the threshold, only management data items in which alterations have occurred, and to which alteration flags are set are written to the difference data of the management data in the NAND flash memory $16_1$ in step 1008. In step 1010, the write address of the difference data of the management data is written to the write position (FIG. 4) of the difference data of the data backup module 18, and the alteration flags of the altered management data items, and the total number of the alteration flags (FIG. 9) are cleared.

When the total number of alteration flags is greater than or equal to the threshold, if a large number of management data items are fragmentarily written to the NAND flash memory $16_1$, the processing to be carried out at the time of startup is slowed, and hence the entire management data is written in step 1012 to the permanent data area, and temporary data area of the NAND flash memory $16_1$ shown in FIG. 4. This is because if the amount of the difference data is increased, the processing to be carried out at the time of startup takes much time.

When the above-mentioned structure is employed, it is possible to prevent the rewriting amount of the NAND flash memory $16_1$ from being increased not by writing the entire management data (dump data) to the NAND flash memory $16_1$ but by writing only the minimum amount of management data corresponding to the areas in the memory device 16 in each of which data has been rewritten to the NAND flash memory $16_1$. It is not necessary to read the entire management data at the time of restoration, and it becomes possible to read only partial difference data.

Figure 11:
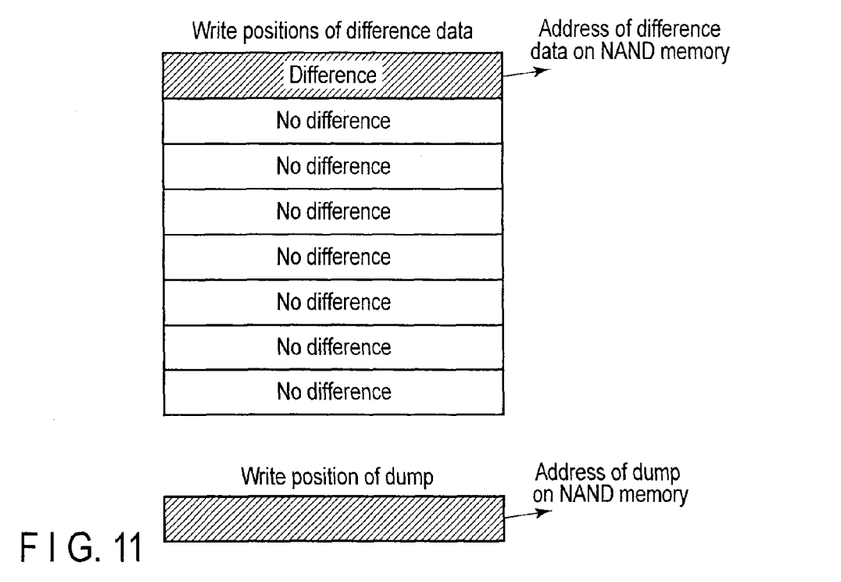
FIG. 11 is an exemplary view showing the control information in the backup controller.

Next, a restoration method of the management data to be employed at the time of restoration will be described below. FIG. 11 gives details of the write positions of the management data items held in the data backup module 18. The write positions are separated into write positions of the difference data, and a write position of the dump data. The write positions are prepared for each of the areas of the management data items of FIG. 9. When there is no difference data (when the management data is not rewritten), pointer data is not recorded.

Figure 12:
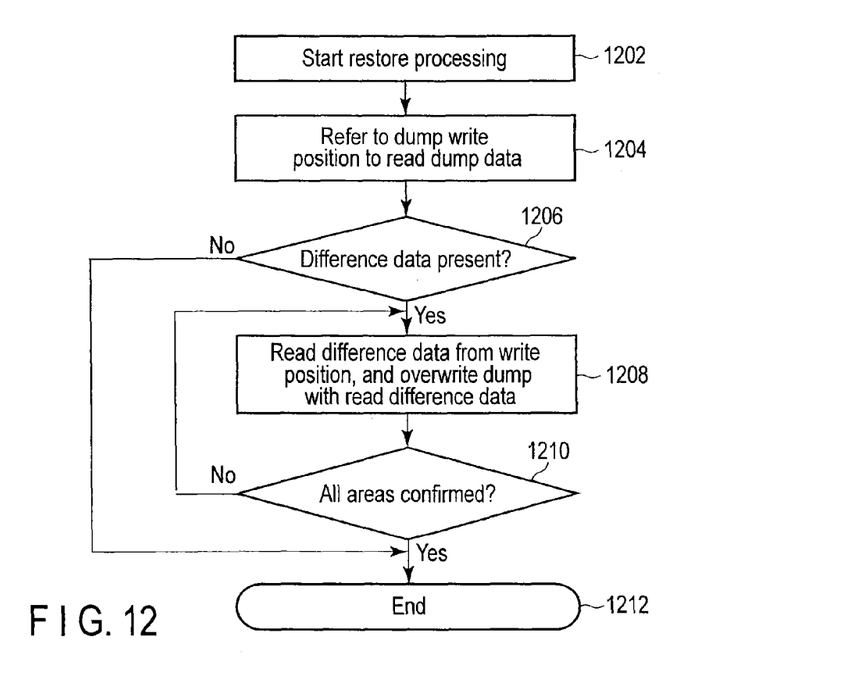
FIG. 12 is an exemplary view showing a restore processing of the control information.

FIG. 12 is a flowchart of the restore processing of the management data in the processing of a return (step 814 of FIG. 8) from the sleep state. In step 1204, the memory controller 14 reads the dump data of the management data from the NAND flash memory $16_1$ on the basis of the storage position of the dump data held in the data backup module 18, and expands the dump data in the management data memory 40 in the memory controller 14. In step 1206, the memory controller 14 determines whether or not there are write positions of the difference data items in the data backup module 18. When no difference data is recorded, the processing is terminated. When the difference data is recorded, the memory controller 14 reads the difference data in step 1208 from the NAND flash memory $16_1$ on the basis of the write position of the difference data, and expands the difference data in the management data memory 40 in the memory controller 14. The read processing of step 1208 is repeated until all the difference data items are read in step 1210. In step 1208, the difference data is read, and is reflected in the dump data.

As described above, according to this embodiment, a plurality of (two in this case) power supply domains of the semiconductor storage device are provided and, when no access from the host occurs, the power supply of the most part of the semiconductor storage device is turned off, whereby it is possible to reduce the power consumption of the semiconductor storage device in the standby state. Further, although when the entire management data is written to the backup memory, both the backup processing and restore processing take much time, only data items in the areas in which alterations have occurred are written to the backup memory, the data items being included in the management data, and hence the processing time does not increase. Furthermore, when the management data is not rewritten, the management data is not written to the backup memory, whereby even when the power supply is frequently turned off, the reliability of the flash memory is not lowered by an increase in the number of times of rewriting of the NAND flash memory.

Furthermore, write positions of the management data are written to the data backup module 18 with respect to the entire management data and difference data items, whereby it becomes possible to read the management data from the backup memory at high speed without using a file system at the time of the normal operation. The reason why the management data has been read by using the file system is that the NAND flash memory is writable after deletion, and the difference data is added in units of pages, and hence it has been necessary to check which difference data item is the latest. However, according to this embodiment, by directly recording the write position of the difference data in the data backup module 18, the file system is made unnecessary.

Figure 13:
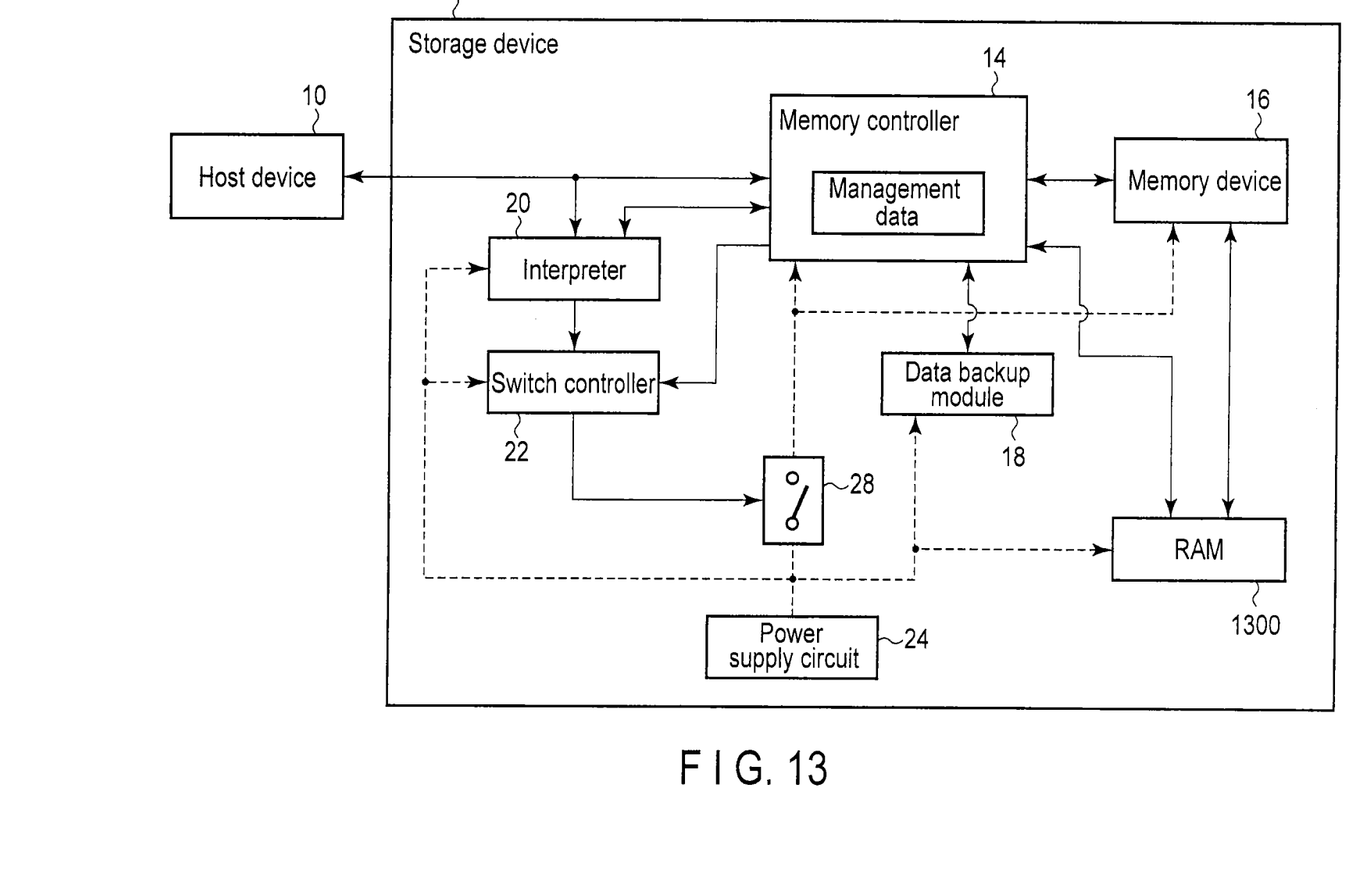
FIG. 13 is an exemplary view showing a semiconductor storage device according to a second embodiment.

Next, a second embodiment will be described below. In the second embodiment, a nonvolatile memory is not used as a backup memory of the management data, and a volatile memory with power-backup is used. FIG. 13 is a block diagram of a semiconductor storage device of the second embodiment. In addition to the configuration of the first embodiment, a RAM 1300 is added. The other parts are identical to the first embodiment. The RAM 1300 is electrically connected to the memory controller 14, memory device 16, and power supply circuit 24, and power is supplied thereto from the power supply circuit 24. The operation of the second embodiment is identical to the first embodiment, and the second embodiment is identical to the first embodiment except that the management data is stored not in the NAND flash memory $16_1$, but in the RAM 1300. That is, the NAND flash memory $16_1$ of FIG. 4 is replaced by the RAM 1300. The second embodiment has an advantage in that the rewriting amount of the nonvolatile memory is not increased by the backup processing concomitant with power-off, and there is no possibility of the reliability of the nonvolatile memory being lowered.

Figure 14:
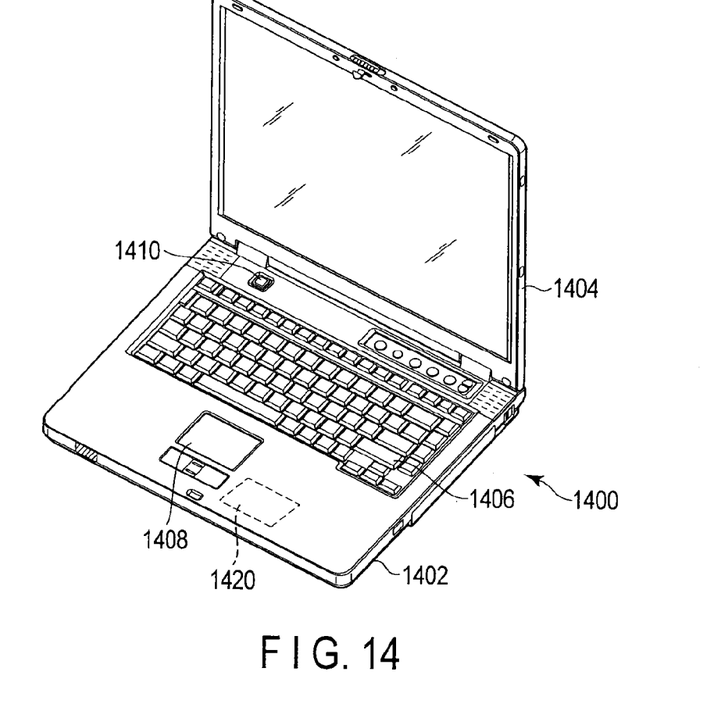
FIG. 14 is an exemplary view showing an information processing apparatus including a semiconductor storage device according to a third embodiment.

In the embodiments described above, although the description has been given on the premise that the SSD (storage device 12) including the NAND flash memories and their controller is a separate body independent of the host device 10 such as a personal computer or the like, now a third embodiment in which the SSD is integral with the host device 10 will be described below. FIG. 14 is a schematic view of a personal computer associated with the third embodiment. Although the host device is shown as, for example, a notebook personal computer, the data processing apparatus can be realized as other devices, such as a television receiver, recorder (for example, a hard disk recorder, and DVD recorder), tablet PC, slate PC, PDA, car navigation system, smartphone, and the like configured to store video data.

As shown in FIG. 14, the personal computer 1400 includes a computer main body 1402, and display unit 1404. The display unit 1404 is attached to the computer main body 1402 in such a manner that the display unit 1404 is freely rotatable between an open position at which the top surface of the computer main body 1402 is exposed, and closed position at which the top surface of the computer main body 1402 is covered with the display unit 1404. The computer main body 1402 includes a thin box-shaped housing, further, on the top surface thereof, a keyboard 1406, pointing device (touch pad) 1408, power button 1410 configured to power on/power off the computer, and the like are arranged and, in the housing, a semiconductor storage device 1420 is arranged.

Figure 15:
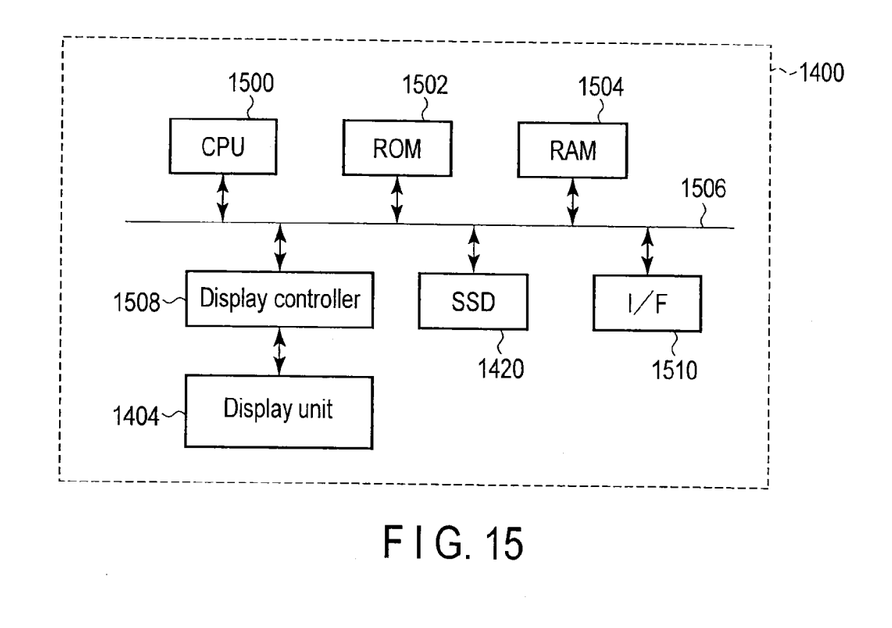
FIG. 15 is an exemplary view showing a block diagram of the information processing apparatus of FIG. 14.

FIG. 15 is a block circuit diagram of the personal computer 1400. A CPU 1500, ROM 1502, and RAM 1504 are connected to a bus line 1506. An SSD 1420, display controller 1508, and interface 1510 are connected to the bus line 1506. The display unit 1404 is connected to the display controller 1508. The SSD 1420 corresponds to the semiconductor storage device 12 of FIG. 1 or FIG. 13. The host device 10 of FIG. 1 or FIG. 13 corresponds to the CPU 1500.

By such a configuration described above, an advantage identical to the first and second embodiment can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor storage device comprising:
a nonvolatile first memory;
a memory controller electrically connected to the first memory, and comprising management data for the first memory;
a switch connected to the first memory and the memory controller, a power supply terminal being connected to the first memory and the memory controller through the switch;
a second memory configured to store the management data read from the memory controller;
an interpreter configured to interpret an instruction from a host device;
a switch controller configured to turn off the switch based on an instruction from the memory controller, and turn on the switch based on an interpretation result of the interpreter; and
a third memory configured to store an address of the management data in the second memory, wherein
the memory controller is configured to write the management data to the second memory, thereafter instruct the switch controller to turn off the switch and, when electrically connected to the power supply terminal, read the management data from the second memory based on the address in the third memory.

2. The semiconductor storage device of claim 1, wherein the first memory comprises a flash memory comprising blocks which are an erase unit, and
the management data comprises data indicative of a state of a block, data for managing an address of data, and a parameter set by the host device.

3. The semiconductor storage device of claim 2, wherein the flash memory is configured to carry out data copying processing between blocks at the time of rewriting, and the data for managing an address comprises a logical address/physical address conversion table for converting a logical block address managed by the host device into a physical address of the flash memory.

4. The semiconductor storage device of claim 1, wherein the memory controller comprises a first interface electrically connected to the host device, a second interface electrically connected to the first memory, a volatile memory configured to store the management data, and a processor connected to the first and second interfaces and the volatile memory.

5. The semiconductor storage device of claim 1, wherein the third memory comprises a flag, and the flag is set when the address of the management data is written to the third memory.

6. The semiconductor storage device of claim 5, wherein the memory controller is configured to read the management data from the second memory based on the address in the third memory when electrically connected to the power supply terminal, and if the flag is set in advance.

7. The semiconductor storage device of claim 6, wherein the second memory is configured to further store a copy of the flag, and
the memory controller is configured to erase the parameter set by the host device in the management data when electrically connected to the power supply terminal and if the copy of the flag stored in the second memory is set in advance.

8. The semiconductor storage device of claim 1, wherein the memory controller is configured to write the management data to the second memory and instruct the switch controller to turn off the switch when an idle state of the semiconductor storage device is detected.

9. The semiconductor storage device of claim 8, wherein the memory controller detects an idle state when there is no access from the host device for a predetermined period of time or more, or when a standby instruction is received from the host device, or when assertion of a signal line for power supply control is detected.

10. The semiconductor storage device of claim 1, wherein the switch controller is configured to turn on the switch when the interpreter detects a return instruction from the host device or when the interpreter detects deassertion of a signal line for power supply control.

11. The semiconductor storage device of claim 1, wherein the memory controller is configured to store sub-management data items obtained by subdividing the management data, and alteration flags each of which indicates that the sub-management data item is rewritten, and
each of the sub-management data items is written to the second memory according to a corresponding alteration flag.

12. The semiconductor storage device of claim 11, wherein the memory controller is configured to
write none of the sub-management data items to the second memory when the number of alteration flags is zero,
write sub-management data items in each of which an alteration flag is set to the second memory when the number of alteration flags is greater than zero, and less than a first number, and
write the entire management data to the second memory when the number of alteration flags is greater than or equal to the first number.

13. The semiconductor storage device of claim 1, wherein the second memory is configured to store the entire management data, and difference data of the management data at different addresses, and
a backup module is configured to store an address of the entire management data, and addresses of difference data items of the management data.

14. The semiconductor storage device of claim 13, wherein the first memory comprises a flash memory comprising a plurality of blocks, each of the blocks corresponding to an erase unit and comprising a plurality of pages, each of the pages corresponding to a write/read unit, and the difference data being a unit of page.

15. The semiconductor storage device of claim 1, wherein a partial area of the first memory comprises the second memory.

16. The semiconductor storage device of claim 1, wherein the second memory comprises a volatile memory electrically connected to the power supply terminal when the switch is in the off-state.

17. The semiconductor storage device of claim 1, wherein the interpreter, the switch controller, and the third memory are electrically connected to the power supply terminal when the switch is in the off-state.

18. A control method of a semiconductor storage device comprising a nonvolatile first memory, a memory controller comprising management data for the first memory, a second memory configured to store the management data read from the memory controller, and a switch connected to the first memory and the memory controller, a power supply terminal being connected to the first memory and the memory controller through the switch, the method comprising:
   writing the management data to the second memory;
   turning off the switch based on an instruction from the memory controller;
   turning on the switch based on an interpretation result of an instruction from a host system; and
   reading the management data from the second memory when the power supply terminal and the memory controller are electrically connected to each other.

19. A semiconductor storage device comprising:
a first nonvolatile memory; and
a controller electrically connected to the first nonvolatile memory and comprising a second memory configured to store management data for the first nonvolatile memory, wherein
when a first condition is established, the controller is configured to write the management data for the first nonvolatile memory stored in the second memory to a third memory, and stop supply of power to a part of the controller comprising the second memory, and to the first nonvolatile memory, and
when a second condition is established, the controller is configured to read the management data from the third memory, write the read management data to the second memory, and resume supply of power to the part of the controller, and to the first nonvolatile memory.

* * * * *